United States Patent [19]

Seki et al.

[11] Patent Number: 4,962,472

[45] Date of Patent: Oct. 9, 1990

[54] AUTOMATIC PROGRAMMING METHOD FOR OUTPUTTING FIGURE ELEMENTS OF PARTS AS WELL AS PART PROFILE DESCRIPTIONS IN RESPONSE TO A PART PROFILE REQUEST

[75] Inventors: Masaki Seki; Takashi Takegahara; Katsunobu Yamaki, all of Tokyo, Japan

[73] Assignee: Fanuc Ltd., Minamitsuru, Japan

[21] Appl. No.: 273,035

[22] PCT Filed: Feb. 29, 1988

[86] PCT No.: PCT/JP88/00220

§ 371 Date: Nov. 7, 1988

§ 102(e) Date: Nov. 7, 1988

[87] PCT Pub. No.: WO88/07228

PCT Pub. Date: Sep. 22, 1988

[30] Foreign Application Priority Data

Mar. 12, 1987 [JP] Japan .................................. 62-57305

[51] Int. Cl.$^5$ .............................................. G06F 9/00
[52] U.S. Cl. .................... 364/900; 364/927.2; 364/927.4; 364/948.2; 364/943
[58] Field of Search ................................ 364/200, 900

[56] References Cited

U.S. PATENT DOCUMENTS 4,672,575 6/1989 Stephens ............................ 364/900

Primary Examiner—Gareth D. Shaw
Assistant Examiner—John G. Mills
Attorney, Agent, or Firm—Staas & Halsey

[57] ABSTRACT

A prescribed menu item on a menu table (108b) is picked to designate a method of defining a figure element, and a predefined figure element displayed on a display screen (106) is picked. A processor (102) defines a new figure element using the picked figure element definition method and the picked figure element, and defines a part profile using figure elements picked in the order of tool motion when the defining of all figure elements is completed. In this case, the processor expresses, in a first format based upon an automatic programming language, figure elements and the part profile as defined, and stores the figure elements and part profile in a storage ares (103b). Using a second format for the figure elements, each point is expressed as the coordinate values thereof, each straight line expressed as the coordinate values of two points, and each circle expressed as the coordinates of the center of the circle and the radius of the circular arc, are stored in a storage area 103c. when there is a request for output of the part profile, the processor (102) outputs the figure elements and the part profile in the automatic programming language using the first format. When a figure element designated by a graphic cursor is identified and when the figure is displayed, processing is performed using the second format.

5 Claims, 7 Drawing Sheets

FIG.2

| EXECUTION | POINT/PATTERN DEFINITION | | STRAIGHT LINE DEFINITION | | CIRCLE DEFINITION | | SPECIAL FIGURE DEFINITION | |
|---|---|---|---|---|---|---|---|---|
| NEW INPUT | · 1a | 1b | — 2a | 2c | 3a | 3c | | |
| NEW DEFINITION | 1c | | 2b | 2e | 3b | | | |
| | | | 2d | | 3d | | | |
| INITIAL SETTING | | | | | 3e | | | |

AUTOMATIC PROGRAMMING METHOD FOR OUTPUTTING FIGURE ELEMENTS OF PARTS AS WELL AS PART PROFILE DESCRIPTIONS IN RESPONSE TO A PART PROFILE REQUEST

BACKGROUND OF THE INVENTION

1. Field of the Invention

This invention relates to an automatic programming method and, more particularly, to an automatic programming method for outputting figure elements and a part profile in an automatic programming language in response to a part profile output request.

2. Description of the Art

In an automatic programming apparatus for creating numerical control (NC) data using an automatic programming language such as APT or FAPT, (a) a part program is internally generated by defining points, straight lines and circular arcs using simple symbols (this is referred to as "figure definition"), and then defining a part profile in the order of tool movement using the defined points, straight lines and circular arcs (this is referred to as "part profile definition"), and (b) the part program is subsequently converted into NC data comprising NC data (EIA codes or ISO codes) in a format capable of being executed by an NC unit.

In this conventional automatic programming system, a point $P_i$ among the figure elements is stored in memory upon being expressed as $$P_i = x_i, y_i$$

using coordinates $x_i$, $y_i$ of the point, a straight line $S_i$ among the figure elements is stored in memory upon being expressed as $$S_i = P(x_m, y_m), P(x_n, y_n)$$

using the coordinates $(x_m, y_m)$, $(x_n, y_n)$ of two points $P_m$, $P_n$ on the straight line, and a circle among the figure elements is stored in memory upon being expressed as $$C_i = x_c, y_c, r$$

using the coordinates $(x_c, y_c)$ of the center of the circle and the radius $r$ of the circle. When it is requested that the part profile be outputted to a printer or display unit as a part program, the items of figure element data are outputted in the order of tool movement and the part program is outputted as a result. By way of example, when a part profile expressed by the bold line in FIG. 7 is defined as $S_1$,
$S_3$,
$S_5$,
$S_2$,
$S_4$,
$C_1$ in the order of tool movement using defined figure elements $S_1$–$S_5$, $C_1$ and output of the part program for this part profile is subsequently requested, the automatic programming system outputs the part program, which is represented by $S_1 = P(10,0), P(0,0)$ $S_3 = P(0,0), P(0,5)$ $S_5 = P(0,5), P(5,10)$ $S_2 = P(5,10), P(15,10)$ $S_4 = P(15,10), P(15,5)$ $C_1 = 15, 0, 5$ to the printer or display unit to be printed out or displayed thereby.

In the prior art, however, the figure elements and part profile are outputted in the same format regardless of how the programmer defines them. Accordingly, how the figure elements and part profile were defined cannot be ascertained merely by looking at the output, and therefore it is difficult to recognize and revise the part profile. Recognition and revision become even more difficult the more complicated the part profile.

SUMMARY OF THE INVENTION

Accordingly, an object of the invention is to provide an automatic programming system in which figure elements are stored in a format the same as that of the prior art, and in which figure elements and a part profile are stored in advance in a format reflecting a definition procedure, and the figure elements and part profile are outputted in the format reflecting the definition procedure, e.g., in automatic programming language, in response to a request for output of a part program.

Figure elements and a part profile are stored upon being expressed, as defined, in a first format based on automatic programming language, points are expressed and stored as the coordinates thereof, straight lines are each expressed and stored as the coordinates of two points, and circles are each expressed and stored as the coordinates of the centers thereof and the radii of circular arcs.

A processor outputs the figure elements and part profile in the automatic programming language using the first format when there is a request for output of the part profile, and executes processing using a second format at the time of processing for identification of a figure element designated by a graphic cursor and processing for figure display.

BRIEF DESCRIPTION OF THE DRAWINGS

FIG. 2 is a view for describing a menu table;

DESCRIPTION OF THE PREFERRED EMBODIMENT

Figure 1:
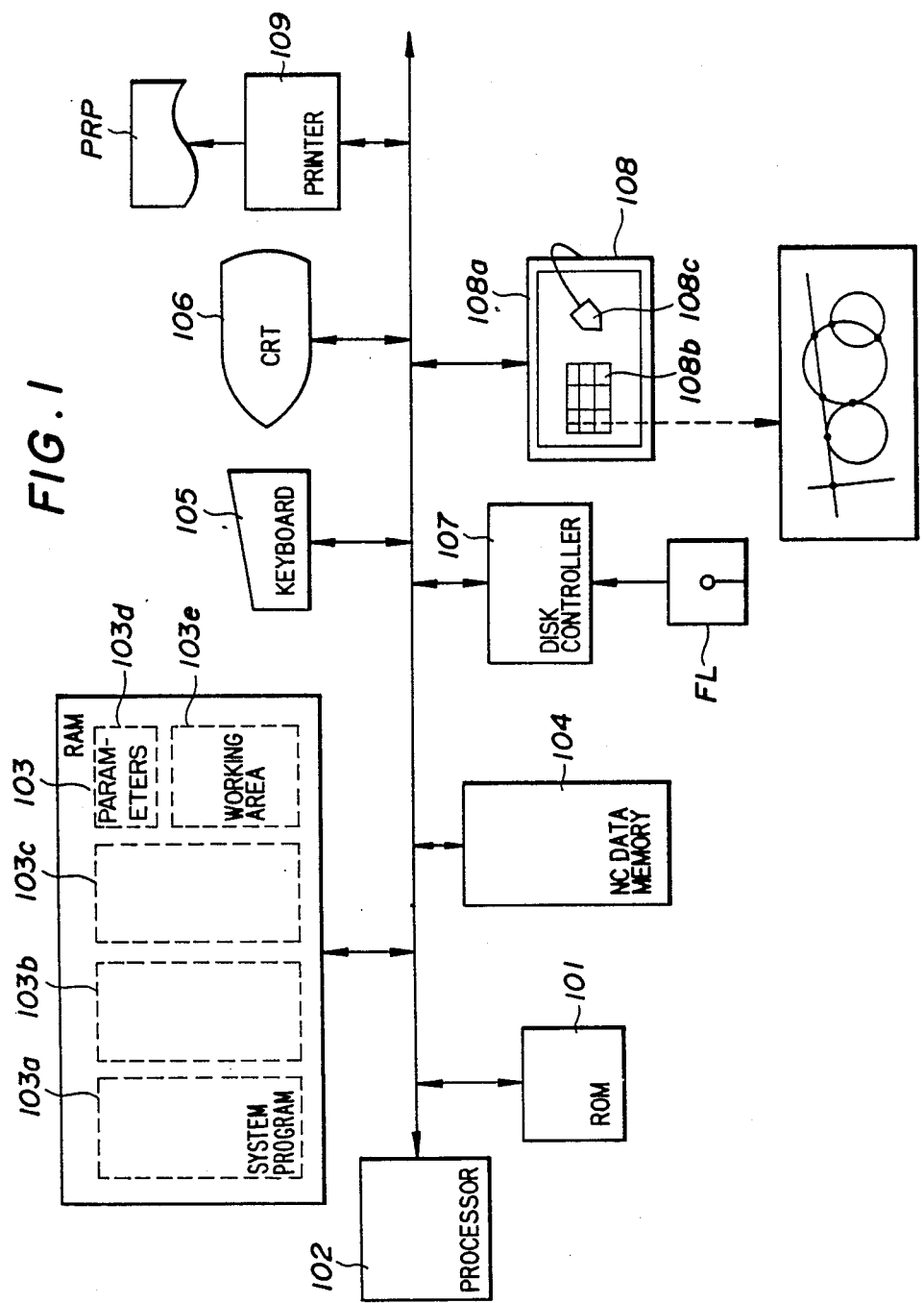
FIG. 1 is a block diagram of an automatic programming system according to the present invention.

FIG. 1 is a block diagram of an automatic programming apparatus which is a first embodiment of the present invention.

Numeral 101 denotes a ROM storing a loading program and the like, 102 a processor for executing automatic programming processing, and 103 a RAM.

The RAM 103 has a storage area 103a for storing a system program STPR for automatic programming read in from a floppy FL, a storage area 103b for storing figure elements and a part profile expressed, as defined, in a first format, e.g., an automatic programming language, a storage area 103c for storing defined points expressed by the coordinates thereof, defined straight lines expressed by the coordinates of two points, and circles expressed by the coordinates of the centers thereof and the circular arc radii, a storage area 103d for storing various parameters PRM, and a working area 103e.

Numeral 104 denotes an NC data memory for storing the NC data created, 105 a keyboard, 106 a graphic display unit (CRT), 107 a disc controller, and 108 a tablet device having a tablet surface 108a to which a menu table 108b having menu items conforming to various methods of defining points, straight lines, circles and the like is affixed. Prescribed menu items are picked by a tablet cursor 108c. A graphic cursor GCS (not shown in FIG. 1) on a display screen is moved by moving the tablet cursor 108a on the tablet surface. FL represents a floppy disc.

FIG. 2 is a view for describing the principal part of the menu table 108b. Numeral 1 is a "POINT PATTERN DEFINITION" section, 2 a "STRAIGHT LINE DEFINITION" section, 3 a "CIRCLE DEFINITION" section, and 4 a "SPECIAL FIGURE DEFINITION" section.

Picking item 1a in the "POINT PATTERN DEFINITION" section 1 designates a definition method for defining a point by directly inputting the coordinates of the point using a keyboard or cursor.

Picking item 1b designates a definition method for defining a point as a point of intersection between two straight lines, a point of tangency between a straight line and a circle, a point of intersection between a straight line and a circle, a point of tangency between two circles, or a point of intersection between two circles.

Picking item 1c designates a definition method for defining a point as the center of a circle. Prescribed groups of points are defined by designating other items.

Picking item 2a in the "STRAIGHT LINE DEFINITION" section 2 designates a definition method for defining a straight line passing through a designated point and parallel to a horizontal line.

Picking item 2b designates a definition method for defining a straight line passing through a designated point and parallel to a vertical line.

Picking item 2c designates a definition method for defining a straight line passing through a designated point and intersecting a horizontal line at a designated angle.

Picking item 2d designates a definition method for defining a straight line tangent to a designated circle and intersecting a horizontal line at a designated angle $\alpha$.

Picking item 2e designates a definition method for defining a straight line passing through two designated points. Predetermined methods of defining straight lines are designated by other items in menu table 108b.

Picking item 3a in the "CIRCLE DEFINITION" section 3 designates a definition method for defining a circle having a designated point as its center and a designated radius.

Picking item 3b designates a definition method for defining a circle having a designated point as its center and passing through another designated point.

Picking item 3c designates a definition method for defining a circle having a designated point as its center and tangent to a designated straight line.

Picking item 3d designates a definition method for defining a circle passing through two designated points and having a designated radius.

Picking item 3e designates a definition method for defining a circle passing through three designated points. Similarly, picking other items designates predetermined methods of defining circles.

Figure 3A:
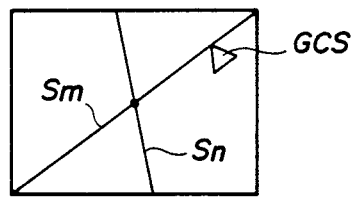
FIGS. 3(a)–3(e) are views for describing point definition.
Figure 3B:
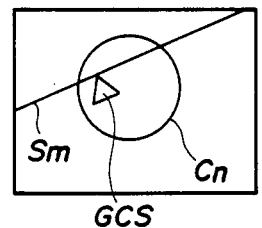
Figure 3C:
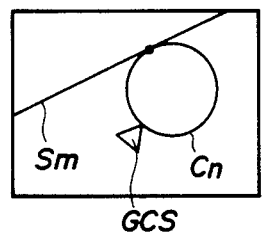
Figure 3D:
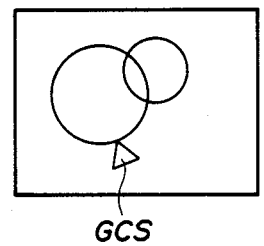
Figure 3E:
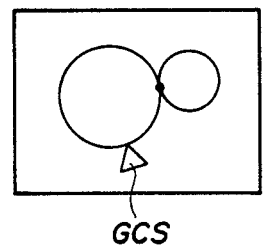

Processing performed by the automatic programming system of the present invention will now be described. Defined figure elements are displayed successively on the display screen. When a point is to be defined among the figure elements, various methods are available, for example:

(i) item 1a in the "POINT PATTERN DEFINITION" section of the menu table 108b is picked and the coordinates of the point are inputted directly from the keyboard 105 as $P_i = x_i, y_i$ to define the point; or (ii) the menu item 1b is picked and two straight lines $S_m$, $S_n$ displayed on the display screen are picked by the graphic cursor GCS to define the point as the intersection between these two straight lines [see FIG. 3(a)]; or (iii) the menu item 1b is picked and a straight line $S_m$ and a circular arc $C_n$ that are displayed on the display screen are picked by the graphic cursor GCS to define the point as whichever of the two points of intersection between the straight line and the circular arc is closest to the picked point [see FIG. 3(b)]; or (iv) the menu item 1c is picked and the straight line $S_m$ and circular arc $C_n$ that are displayed on the display screen are picked to define the point as the point of tangency between the straight line and the circular arc [see FIG. 3(c)]; or (v) the point is defined as whichever of the two points of intersection between two circular arcs is an upper point or lower point (a rightward point or leftward point) [see FIG. 3(d)]; or (vi) the point is defined as a point of tangency between two circular arcs [see FIG. 3(e)].

In the case of the point definition (ii), the processor 102 identifies the two straight lines that have been picked, creates a figure definition statement $$P_i = S_m, S_n$$

expressed, in accordance with the point definition, in a first format, e.g., an automatic programming language, and stores the statement in the storage area 103b of the RAM 103. The processor 102 also computes the coordinates $x_i, y_i$ of the point of intersection between the two straight lines $S_m, S_n$, and stores point definition data $$P_i = x_i, y_i$$

expressed in a second format in the storage area 103c of the RAM 103.

Similarly, in case of the point definition (iii), the processor 102 creates a figure definition statement $$P_i = S_m, C_n, L \text{ (or R)}$$

expressed in an automatic programming language which is the first format, and stores the statement in the storage area 103b. The processor 102 also computes the coordinates $x_i$, $y_i$ of the leftward point of intersection between the straight line $S_m$ and the circular arc $C_n$ and stores point definition data $$P_i = x_i, y_i$$

expressed in the second format in the storage area 103c of the RAM 103.

Further, in case of the point definition (iv), the processor creates a point definition statement $$P_i = S_m, C_n$$

expressed in the first format, creates point definition data $$P_i = x_i, y_i$$

expressed in the second format, and stores these in the respective storage areas 103b, 103c of the RAM 103.

The points defined above are displayed on the graphic display unit 106 using the second format.

Figure 4A:
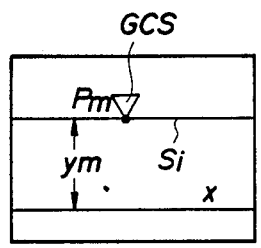
FIGS. 4(a)–4(g) are views for describing straight line definition.
Figure 4B:
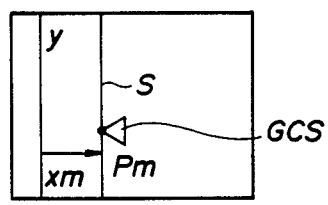
Figure 4C:
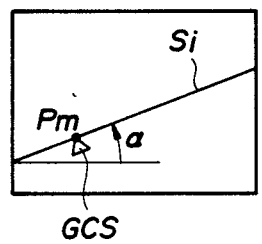
Figure 4D:
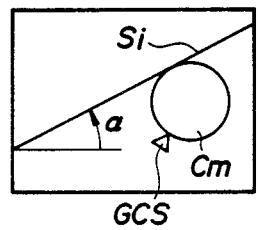
Figure 4E:
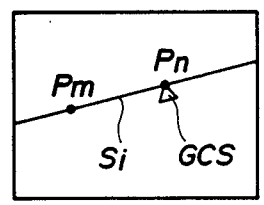
Figure 4F:
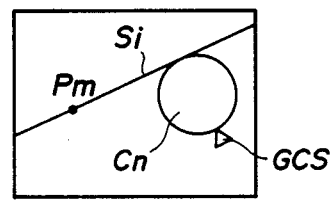
Figure 4G:
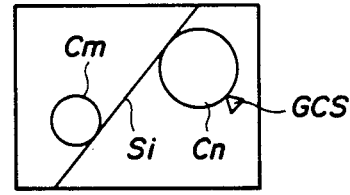

When a straight line is to be defined, various methods are available, for example:

(i) item 2a in the "STRAIGHT LINE DEFINITION" section of the menu table 108b is picked by the tablet cursor 108c, a point $P_m$ a distance $y_m$ from the x axis, which is a horizontal line, is picked by the graphic cursor GCS, and the straight line is defined as a straight line the distance $y_m$ from the horizontal line and parallel thereto [see FIG. 4(a)]; or (ii) the menu item 2b is picked by the tablet cursor 108c, a point $P_m$ a distance $x_m$ from the y axis, which is a vertical line, is picked by the graphic cursor GCS, and the straight line is defined as a straight line the distance $x_m$ from the vertical line and parallel thereto [see FIG. 4(b)]; or (iii) the menu item 2c is picked, a point $P_m$ is picked by the graphic cursor GCS, an angle $\alpha$ formed with the horizontal axis is inputted from the keyboard 105, and the straight line is defined as a straight line $S_i$ [see FIG. 4(c)]; or (iv) the menu item 2d is picked, a circular $C_m$ is picked by the graphic cursor GCS, a horizontal axis and an angle $\alpha$ are inputted from the keyboard, and the straight line is defined as a straight line $S_i$ [see FIG. 4(d)]; or (v) the menu item 2e is picked, two points $P_m$, $P_n$ are picked by the graphic cursor GCS, and the straight line is defined as a straight line $S_i$ passing through these two points; or (vi) the straight line is defined as a straight line $S_i$ passing through the point $P_m$ and tangent to a circular arc $C_n$ [see FIG. 4(f)]; or (vii) the straight line is defined as a straight line $S_i$ tangent to two circular arcs $C_m$, $C_n$ [see FIG. 4(g)].

In accordance with the straight line definition (i) described above, the processor 102 identifies the point $P_m$ ($x_m, y_m$) that has been picked, creates a straight line definition statement $$S_i = y_m Y$$

expressed, in accordance with the straight line definition, in an automatic programming language, and stores the statement in the storage area 103b of the RAM 103. The processor also obtains the coordinates $x_n$, $y_n$ of the second point on the defined straight line, creates straight line definition data $$S_i = P(x_m, y_m), P(x_n, y_n)$$

in a second format and stores the data in the storage area 103c of the RAM 103.

Similarly, in accordance with the straight line definition (ii) described above, the processor 102 identifies the point $P_m$ ($x_m, y_m$) that has been picked, creates a straight line definition statement $$S_i = x_m X$$

expressed, in accordance with the straight line definition, in an automatic programming language, and stores the statement in the storage area 103b of the RAM 103. The processor also obtains the coordinates $x_n$, $y_n$ of the second point on the defined straight line, creates straight line definition data $$S_i = P(x_m, y_m), P(x_n, y_n)$$

in the second format and stores the data in the storage area 103c of the RAM 103.

Figure 5A:
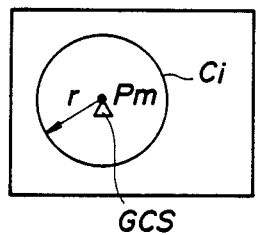
FIGS. 5(a)–5(g) are views for describing circle definition.
Figure 5B:
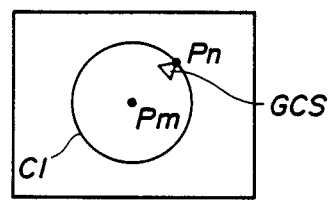
Figure 5C:
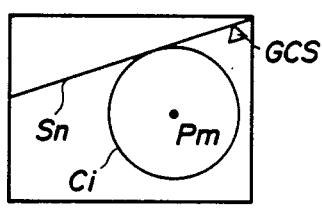

In the case of straight line definition (iii), $$S_i = P_m, \alpha$$

is created in the first format, straight line definition data $$S_i = P(x_m, y_m), P(x_n, y_n)$$

is created in the second format, and these are stored in the RAM 103. In the case of (iv) and (v), straight line definition statements $$S_i = C_m, \alpha$$

$$S_i = P_m, P_n$$

are created in the first format based on an automatic programming language, and straight line definition data $$S_i = P(x_m, y_m), P(x_n, y_n)$$

is created in the second format and stored in the RAM 3. The straight line defined above is displayed on the display unit 106 using the second format. When a circular arc is to be defined, various methods are available, for example:

the item 3a in the "CIRCLE DEFINITION" section of the menu table is picked, a point $P_m$ displayed on the display screen is picked by the graphic cursor GCS, and the radius r thereof is inputted from the keyboard to define a circle of radius r and center $P_m$ [see FIG. 5(a)]; or (ii) the menu item 3b is picked, points $P_m$, $P_n$ are picked by the graphic cursor GCS, and a circle $C_i$ having a center $P_m$ and passing through the point $P_n$ is defined [see FIG. 5(b)]; or (iii) the menu item 3c is picked, a point $P_m$ and a straight line $S_n$ are picked by the graphic cursor GCS, and a circle $C_i$ of center $P_m$ tangent to the straight line $S_n$ is defined [see FIG. 5(c)].

Figure 5D:
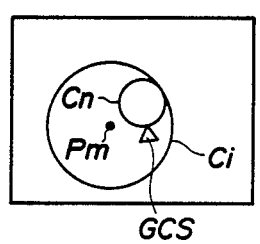
Figure 5E:
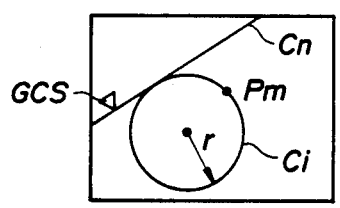

The circular arc can also be defined as one which has the center $P_m$ and is tangent to the circle $C_n$ [see FIG. 5(d)], or one which has the radius r, passes through the point $P_m$ and is tangent to the straight line $S_n$ see FIG.

Figure 5F:
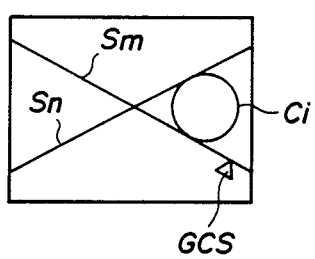
Figure 5G:
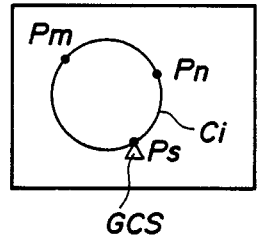

5(e)]. Further, a circle can be defined as one tangent to two straight lines $S_m$, $S_n$ [see FIG. 5(f)], or a circle can be defined as one passing through three points $P_m$, $P_n$, $P_s$ [see FIG. 5(g)]. In the case of circle definition (i) described above, the processor 102 creates a circle definition statement $$C_i = P_m, r$$

based on an automatic programming language, and stores the statement in the storage area 103b. The processor 102 also obtains the coordinates $x_m$, $y_m$ of the center $P_m$ of the circle, creates circle definition data $$C_i = x_m, y_m, r$$

in a second format and stores the data in the storage area 103c.

In case of (ii) and (iii), circle definition statements $$C_i = P_m, P_n$$

$$C_i = P_m, S_n$$

are created based on automatic programming language, and circle definition data $$C_i = x_m, y_m, r$$

is created in the second format and stored in the RAM 103. Processing is similar for the other cases as well. The circle defined above is displayed on the display unit 106 using the second format.

When figure definition is ended by the foregoing processing, figure elements are subsequently picked by the graphic cursor GCS in the order of tool movement using the defined figure elements (which are being displayed), thereby defining a part profile.

Thus, the processor 102 creates a part profile definition statement in automatic programming language, stores the statement in the storage area 103b, subsequently creates NC data, in a code executable by an NC unit, based on a part program (which comprises a figure definition statement and a part profile definition statement) expressed in the first format and stored in the storage area 103b, and stores the data in the memory 104.

Figure 6:
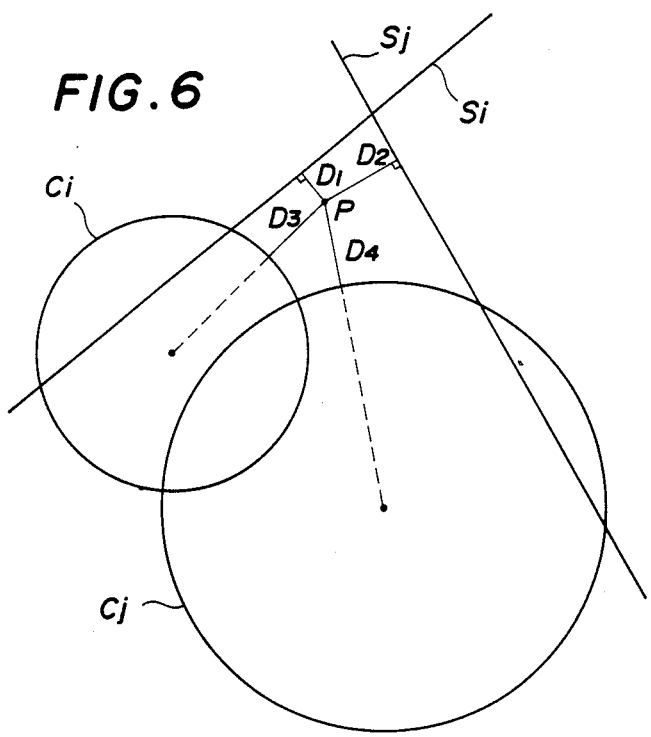
FIG. 6 is a view for describing processing for picking figure elements.

In order to identify which figure element has been picked by the graphic cursor GCS, the figure data expressed in the second format is used. In other words, as shown in FIG. 6, distances $D_1$-$D_4$ of figure elements $S_i$-$C_j$ from a point P, which is selected by the graphic cursor GCS, are computed using data expressed in the second format, and the figure element $S_i$ nearest the point is judged to be the element picked.

When a part program output request is generated by the keyboard 105 or the tablet unit 108, the part program, which is stored in the storage area 103b and expressed in the first format based on automatic programming language, is outputted by the graphic display unit 106 or printer 109.

Figure 7:
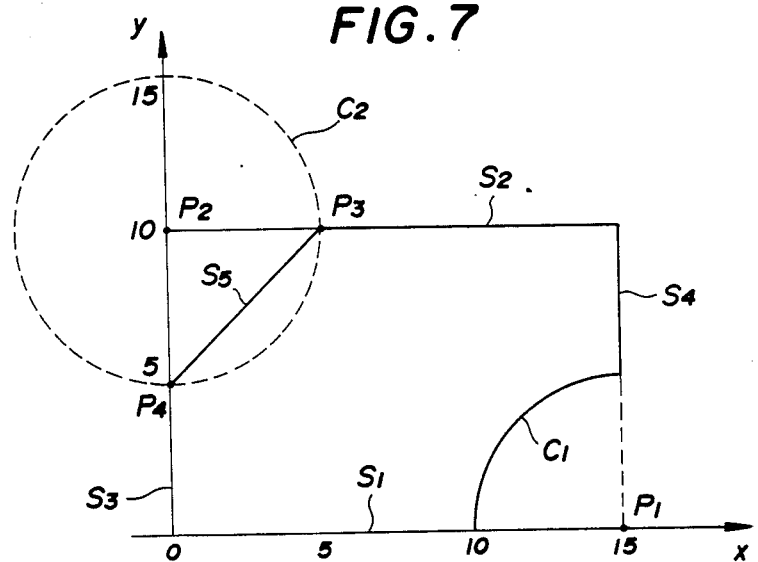
FIG. 7 is a view of a part profile for describing a part program output format in the prior art and the present invention.
Figure 8:
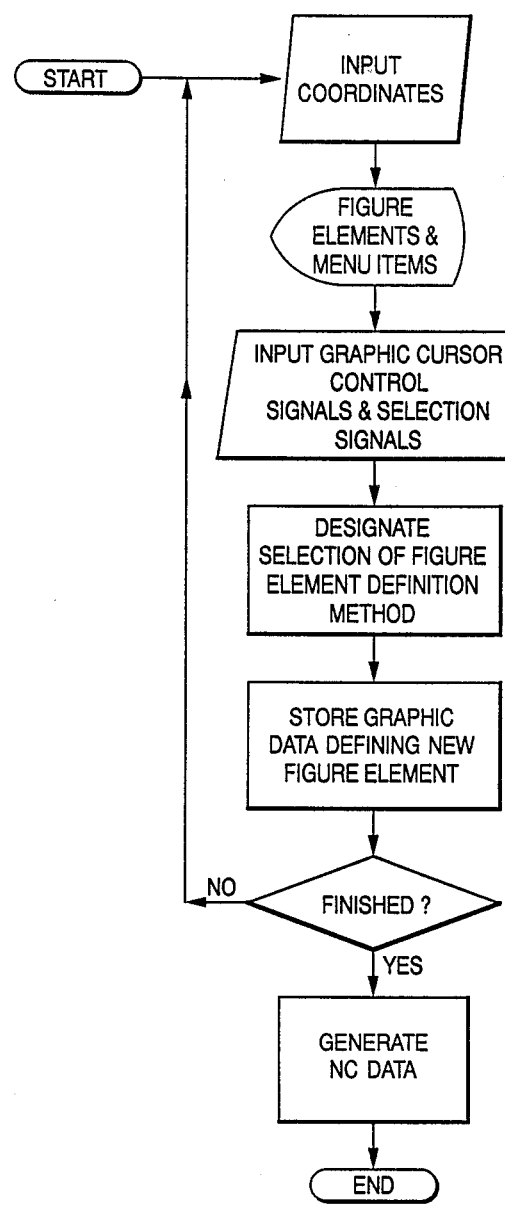
FIG. 8 is a flowchart of a method according to the present invention.

By way of example, to define a part profile expressed by the bold line in FIG. 7, (1) $S_1$, $S_2$ are defined as straight lines parallel to the x axis, (2) $S_3$, $S_4$ are defined as straight lines parallel to the y axis, (3) a circle $C_1$ the radius of which is 5 and whose center $P_1$ is the point of intersection between $S_1$ and $S_4$ is defined, and (4) a circle $C_2$ the radius of which is 5 and whose center $P_2$ is the point of intersection between $S_2$ and $S_3$ is defined, a straight line $S_5$ connecting the right-hand point of intersection $P_3$ between $C_2$ and $S_2$ and the lower point of intersection $P_4$ between $C_2$ and $S_3$ is defined, and, by using these figure elements, the part profile is subsequently defined by assuming that the tool will move in the order $S_1$, $S_3$, $S_5$, $S_2$, $S_4$, $C_1$. Then, when output of a part program is requested, a figure definition statement and a part profile definition statement are outputted, as defined by the programmer, in an automatic programming language in the form

| | |
|---|---|
| $S_1 = 0Y$ | |
| $S_3 = 0X$ | |
| $S_2 = 10Y$ | |
| $P_2 = S_2, S_3$ | |
| $C_2 = P_2, 5$ | |
| $P_3 = S_2, C_2, R$ | |
| $P_4 = S_2, C_2, B$ | |
| $S_5 = P_3, P_4$ | |
| $S_4 = 15X$ | |
| $P_1 = S_1, S_4$ | |
| $C_1 = P_1, 5$ | ... Let (a) represent the above |
| $S_1$ | |
| $S_3$ | |
| $S_5$ | |
| $S_2$ | |
| $S_4$ | |
| $C_1$ | ... Let (b) represent the above |

As a result, the part profile can be easily recognized and easily revised. In should be noted that (a) in the above-mentioned part program is the figure definition statement and (b) is the part profile definition statement.

Thus, in accordance with the present invention, the arrangement is such that figure elements and a part profile are generated in a first format, e.g., in an automatic programming language, as defined by the programmer, and the figure elements and part profile are stored in memory. When there is a part profile output request, the figure elements and the part profile expressed in the automatic programming language are outputted. This makes the part profile easy to recognize and easy to revise. Further, in accordance with the invention, figure elements and a part profile are expressed, as defined, in a second format, based on an automatic programming language, and the figure elements and part profile are stored. Points are expressed and stored as numerical values, straight lines are each expressed and stored as the coordinates of two points, and circles are each expressed and stored as the coordinates of the center of the circle and the radius of the circular arc. As a result, at the time of processing for identification of a figure element designated by a graphic cursor GCS and processing for figure display, processing can be executed with ease using the second format.

What is claimed is:

1. An automatic programming method for creating part profile data for numerical control, using a computer receiving input signals from an input device having a tablet surface with a menu table having menu items conforming to various methods of inputting figure data defining figure elements, including points, straight lines and circles constituting a part profile, said method comprising the steps of:
   (a) displaying previously inputted figure elements on a display screen;
   (b) designating a figure element definition method corresponding to one of the menu items on the menu table and a specific figure element displayed on the display screen;

(c) defining a new figure element using the figure element definition method and the specific figure element designated in step (b);

(d) executing processing using the figure data expressed in one of the first and second formats to produce part profile data; and (e) storing the new and previously inputted figure elements and the part profile data in a memory in a first format indicating the various methods of defining and using a second format to store each point as coordinate values thereof, each straight line as coordinate values of two points and each circle as coordinates of the center and radius of the circle.

2. An automatic programming method according to claim 1, wherein the first format indicates how the figure elements and the part profile were defined using an automatic programming language.

3. An automatic programming method according to claim 1, wherein step (d) comprises computing the coordinate values of each point and the radius of each circle expressed in the second format in dependence upon the figure element definition method and the specific figure element designated in step (c).

4. An automatic programming method according to claim 1, further comprising the step of (f) outputting, in response to a request for output of the part profile, the part profile in a programming language based on the first format.

5. An automatic programming method according to claim 1,
wherein said designating in step (c) comprises the step of designating the specific figure element by a graphic cursor, and
wherein said designating in step (c) and said displaying of the previously inputted figure elements in step (b) use the figure data stored in the second format.

* * * * *